United States Patent
Yoshikawa et al.

(12)

(10) Patent No.: US 9,327,994 B2
(45) Date of Patent: May 3, 2016

(54) ZINC OXIDE POWDER AND PROCESS FOR MANUFACTURING SAME

(71) Applicant: NGK INSULATORS, LTD., Nagoya-Shi (JP)

(72) Inventors: Jun Yoshikawa, Nagoya (JP); Katsuhiro Imai, Nagoya (JP); Koichi Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/570,122

(22) Filed: Dec. 15, 2014

(65) Prior Publication Data

US 2015/0099122 A1 Apr. 9, 2015

Related U.S. Application Data

(63) Continuation of application No. PCT/JP2013/066366, filed on Jun. 13, 2013.

(30) Foreign Application Priority Data

Jul. 2, 2012 (JP) ................................. 2012-148531

(51) Int. Cl.
*C01G 9/02* (2006.01)
(52) U.S. Cl.
CPC ............... *C01G 9/02* (2013.01); *C01P 2002/52* (2013.01); *C01P 2002/54* (2013.01); *C01P 2004/03* (2013.01); *C01P 2004/20* (2013.01); *C01P 2004/61* (2013.01); *C01P 2006/12* (2013.01); *Y10T 428/2982* (2015.01)
(58) Field of Classification Search
None
See application file for complete search history.

(56) References Cited

FOREIGN PATENT DOCUMENTS

| | | |
|---|---|---|
| CN | 1120331 A | 4/1996 |
| CN | 101786651 A | 7/2010 |
| EP | 0 317 272 A1 | 5/1989 |
| EP | 0 486 182 A1 | 5/1992 |
| EP | 0 826 643 A1 | 3/1998 |
| JP | 05-070124 A | 3/1993 |
| JP | 07-069631 A | 3/1995 |
| JP | 07-165422 A | 6/1995 |
| JP | 08-510436 A | 11/1996 |
| JP | 10-139552 A | 5/1998 |
| JP | 3512838 B | 1/2004 |
| JP | 3559293 B | 5/2004 |
| JP | 4378535 B | 10/2009 |
| JP | 4807569 B | 8/2011 |

OTHER PUBLICATIONS

Machine translation JP H07-069631 (1995).*
Machine translation JP H08-510436 (1996).*
(Continued)

*Primary Examiner* — Alexandre Ferre
(74) *Attorney, Agent, or Firm* — Burr & Brown, PLLC

(57) ABSTRACT

The present invention provides a zinc oxide powder that enables a high degree of orientation, and highly uniform dispersion of an additive substance, to be simultaneously achieved in a green body or a sintered body. The zinc oxide powder of the present invention comprises a plurality of plate-like zinc oxide particles and has a volume-based D50 average particle diameter of 1 to 5 μm and a specific surface area of 1 to 5 m²/g. The zinc oxide powder has a degree of orientation of the (002) plane of 40% or greater when two-dimensionally arrayed into a monolayer on a substrate.

13 Claims, 2 Drawing Sheets

(56) References Cited

OTHER PUBLICATIONS

International Search Report and Written Opinion, International Application No. PCT/JP2013/066366, dated Jul. 30, 2013 (13 pages).
Han, G., et al. "Nanosized Hexagonal Plateletlike ZnO for Nanophosphor Applications," *J. Vac. Sci. Technol. B*, vol. 28, No. 2, dated Mar./Apr. 2010 (pp. C2C16-C2C19).
May-Ying Chu, et al., "Effect of Heating Rate on Sintering and Coarsening," *Journal of the American Ceramic Society*, vol. 74, No. 6, Jun. 1, 1991, pp. 1217-1225.
Mehdi Mazaheri, "Sintering of Nanocrystalline Zinc Oxide via Conventional Sintering, Two Step Sintering and Hot Pressing," *Proceedings of the 11th ECERS Conference*, Krakow, Jan. 1, 2009, pp. 579-582.
Satoshi Yamabi, et al., "Growth Conditions for Wurtzite Zinc Oxide Films in Aqueous Solutions," *Journals of Materials Chemistry, The Royal Society of Chemistry*, vol. 12, Jan. 1, 2002, pp. 3773-3778.
Tapatee Kundu Roy, et al., "Sintering Studies of Nono-Crystalline Zinc Oxide," *Ceramics International*, Elsevier, Amsterdam, NL, vol. 34, No. 1, Oct. 29, 2007, pp. 81-87.
Kevin G. Ewsuk, et al., "Analysis of Nanocrystalline and Microcrystalline ZnO Sintering Using Master Sintering Curves," *Journal of the American Ceramic Society*, vol. 89, No. 6, Jun. 1, 2006, pp. 2003-2009.
Sebastian Schwarz, et al., "Low Temperature Sintering of Nanocrystalline Zinc Oxide: Effect of Heating Rate Achieved by Field Assisting Sintering/Spark Plasma Sintering," *Journal of the American Ceramic Society*, vol. 95, No. 8, Apr. 27, 2012, pp. 2451-2457.
Extended European Search Report (Application No. 13812462.3) dated Feb. 10, 2016.

\* cited by examiner

ZINC OXIDE POWDER AND PROCESS FOR MANUFACTURING SAME

CROSS-REFERENCE TO RELATED APPLICATIONS

This application is a continuation application of PCT/JP2013/066366 filed Jun. 13, 2013, which claims priority to Japanese Patent Application No. 2012-148531 filed Jul. 2, 2012, the entire contents all of which are incorporated herein by reference.

BACKGROUND OF THE INVENTION

1. Field of the Invention

The present invention relates to a zinc oxide powder comprising plate-like zinc oxide particles.

2. Description of the Related Art

Zinc oxide (ZnO) is a material to which various functions such as electroconductive properties, thermoelectric properties, and piezoelectric properties can be imparted through a suitable material design. It is known that orienting a certain crystal plane is effective for enhancing these properties. For example, as a method for obtaining an oriented sintered body, a method is known in which plate-like particles are used as a raw material, a green body is prepared using a molding method such as tape casting or extrusion molding in which shearing force is applied to the plate-like particles, and this green body is sintered (for example, Patent Document 1 (JP10-139552A)).

To date, methods for preparing plate-like zinc oxide particles having various particle sizes have been proposed, and such particles mostly are dense, plate-like particles (see, for example, Non-Patent Document 1 (J. Vac. Sci. Technol. B28 (2), C2C16-C2C19 (2010)), Patent Document 2 (JP4807569B), Patent Document 3 (JP3512838B), and Patent Document 4 (JP3559293B)). However, although a green body having a high degree of orientation can be easily prepared in the case where dense, plate-like zinc oxide particles having a particle diameter exceeding 1 μm are used as a raw material and a molding method as described above in which shearing force is applied is employed, it is difficult to uniformly disperse an additive substance such as a dopant. On the other hand, in the case where plate-like dense zinc oxide particles are fine, with the particle diameter thereof being no greater than several hundreds of nm, although it is easy to uniformly disperse an additive substance, sufficient application of shearing force to the particles is not achieved, and it is difficult to prepare a green body having a high degree of orientation. Thus, it is difficult to simultaneously achieve a high degree of orientation and uniform dispersion of an additive substance in a green body.

As another method for obtaining an oriented sintered body, a method in which a magnetic field is applied to a slurry is known (see, for example, Patent Document 5 (JP4378535B)). Although a green body having a high degree of orientation can be obtained by this method even when a fine raw material is used, a superconducting magnet needs to be used, and there is a problem of increased costs.

CITATION LIST

Patent Documents

Patent Document 1: JP10-139552A
Patent Document 2: JP4807569B
Patent Document 3: JP3512838B
Patent Document 4: JP3559293B
Patent Document 5: JP4378535B Non-Patent Document Non-Patent Document 1: J. Vac. Sci. Technol. B28(2), C2C16-C2C19 (2010)

SUMMARY OF THE INVENTION

The inventors have currently found that it is possible to provide a zinc oxide powder that enables a high degree of orientation and highly uniform dispersion of an additive substance to be simultaneously achieved in a green body or a sintered body.

Accordingly, an object of the present invention is to provide a zinc oxide powder that enables a high degree of orientation and highly uniform dispersion of an additive substance to be simultaneously achieved in a green body or a sintered body.

According to an aspect of the present invention, there is provided a zinc oxide powder comprising a plurality of plate-like zinc oxide particles, the zinc oxide powder having a volume-based D50 average particle diameter of 1 to 5 μm, a specific surface area of 1 to 5 $m^2/g$, and a degree of orientation of a (002) plane of 40% or greater when the zinc oxide powder is two-dimensionally arrayed into a monolayer on a substrate.

According to another aspect of the present invention, there is provided a method for producing a plate-like zinc oxide powder, comprising the steps of:

subjecting a zinc ion-containing raw material solution to a solution method to produce plate-like zinc oxide precursor particles, and calcining the plate-like precursor particles by increasing a temperature to a calcination temperature according to a temperature schedule that includes a temperature zone where the temperature is increased at a rate of 150° C./h or lower to produce a zinc oxide powder comprising a plurality of plate-like zinc oxide particles.

DETAILED DESCRIPTION OF THE INVENTION

Zinc Oxide Powder

Figure 1:
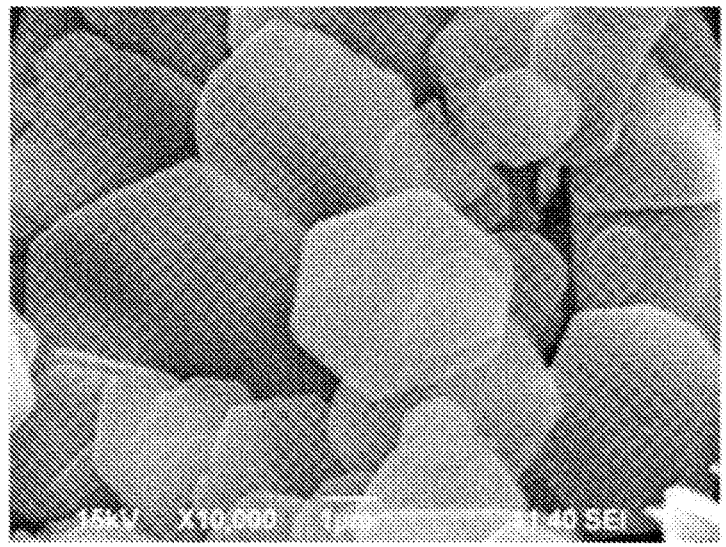
FIG. 1 is an SEM image of a zinc oxide precursor material obtained in Example 1.

The zinc oxide powder according to the present invention comprises a plurality of plate-like zinc oxide particles. The plate-like zinc oxide particles typically are hexagonal plate-like particles and are secondary particles in which primary particles of a zinc oxide crystal having a hexagonal wurtzite structure are bonded to form a plate shape. The zinc oxide powder of the present invention has a volume-based D50 average particle diameter (median diameter) of 1 to 5 μm and a specific surface area of 1 to 5 $m^2/g$. Thus, the zinc oxide powder of the present invention is composed of plate-like particles, and therefore, preparing a green body or a sintered body using a molding method such as tape casting or extrusion molding in which shearing force is applied to plate-like particles makes it possible to obtain a green body or a sintered body in which plate-like particles are oriented. This is because the direction of plate-like particles is controlled by the shearing force. In this regard, since the zinc oxide powder of the present invention has a relatively large average particle diameter, i.e., a volume-based D50 average particle diameter of 1 to 5 μm, it is easy to control the direction of plate-like particles, and a high degree of orientation can be achieved. Specifically, the zinc oxide powder of the present invention has a degree of orientation of the (002) plane of 40% or greater when the zinc oxide powder is two-dimensionally arrayed into a monolayer on a flat substrate. As indicated by a specific surface area of 1 to 5 m$^2$/g, the zinc oxide powder of the present invention has many pores. Accordingly, when an additive substance is mixed with the zinc oxide powder for imparting certain properties, the additive substance can readily enter porous portions, and therefore the additive substance can be uniformly dispersed in the zinc oxide powder or zinc oxide particles. Thus, with the additive substance being uniformly dispersed, it is possible for a green body or a sintered body to exert to the maximum extent the desired properties that are to be imparted by the additive substance.

The volume-based D50 average particle diameter of the zinc oxide powder is 1 to 5 μm, preferably 1.5 to 4.5 μm, and more preferably 2 to 4 μm. The D50 average particle diameter can be measured with a commercially available laser diffraction particle size distribution analyzer. The specific surface area of the zinc oxide powder is 1 to 5 m$^2$/g, preferably 1.5 to 4.5 m$^2$/g, and more preferably 2 to 4 m$^2$/g. The specific surface area can be measured with a commercially available flow-type specific surface area analyzer. The volume of pores having a pore diameter of 10 nm or greater and 1 μm or less per unit weight of the zinc oxide powder is preferably 0.08 mL/g or greater, more preferably 0.1 to 1.0 mL/g, and even more preferably 0.1 to 0.5 mL/g. The pore volume can be measured with a commercially available mercury intrusion porosimeter.

The zinc oxide powder of the present invention can have appropriate particle strength, thereby does not become excessively fine when being mixed with an additive substance or a binder, and can retain a plate-like particle shape that contributes to a high degree of orientation until molding (in particular, until application of shearing force). Such particle strength can be evaluated according to the change in average particle diameter before and after ball mill treatment. Specifically, when ball mill treatment is performed on the zinc oxide powder, the ratio of a volume-based D50 average particle diameter of the zinc oxide powder before the ball mill treatment $D_1$ to a volume-based D50 average particle diameter of the zinc oxide powder after the ball mill treatment $D_2$, i.e., $D_1/D_2$, is preferably less than 4.0, more preferably less than 3.8, and even more preferably less than 3.5. The lower the $D_1/D_2$ ratio is, the more desirable it is, but the ratio is typically 1.5 or greater. This ball mill treatment can be performed by placing 0.2 g of zinc oxide powder, 30 g of ethanol, and 200 g of ϕ2 mm zirconia grinding balls in a pot having a volume of 100 mL, and grinding the powder with a ball mill at 124 rpm for 6 hrs, but as long as a technique that brings about roughly the same grinding effect as this technique is used, conditions are not limited to the aforementioned conditions and can be suitably changed.

As stated above, the plate-like zinc oxide particles may further comprise an additive substance. The additive substance may be configured to form a solid solution in the plate-like zinc oxide particles in advance, or may be configured to simply coexist with or be mixed with the plate-like zinc oxide particles without forming a solid solution and then form a solid solution when a sintered body is formed. Such additive substances may be, as secondary components, various additive agents or dopants, which impart properties (such as electroconductive or insulative properties) desired depending on the use or the specification of a green body. Preferable examples of dopant elements include B, Al, Ga, In, C, F, Cl, Br, I, H, Li, Na, K, N, P, As, Cu, Ag, and any combinations of these. Preferable examples of n-type dopant elements include B, Al, Ga, In, C, F, Cl, Br, I, and various combinations of these, and preferable examples of p-type dopant elements include H, Li, Na, K, N, P, As, C, Cu, Ag, and any combinations of these.

When two-dimensionally arrayed into a monolayer on a flat substrate, the zinc oxide powder of the present invention has a degree of orientation of the (002) plane of 40% or greater, preferably 50% or greater, more preferably 60% or greater, even more preferably 70% or greater, and particularly preferably 80% or greater. Here, the phrase "two-dimensionally arrayed into a monolayer" means a state in which a large number of plate-like zinc oxide particles, not overlapping with each other, are arrayed into a thin-film form, with the plate faces of the particles being in planar contact with the surface of a substrate. The higher the degree of orientation is, the more desirable it is, but typically the degree of orientation is 99% or less. A thin film composed of plate-like zinc oxide particles that are two-dimensionally arrayed into a monolayer can be obtained by spin-coating a dispersion, which is obtained by adding a zinc oxide powder to a solvent and ultrasonically dispersing the powder, onto a flat substrate such as a glass substrate. The degree of orientation of the (002) plane can be measured by performing XRD on a thin film composed of plate-like zinc oxide particles that are two-dimensionally arrayed into a monolayer. This measurement can be performed by obtaining an XRD profile through irradiating a sample plane with an X ray by use of a commercially available XRD apparatus and calculating the degree of orientation F of the (002) plane according to the formulae below:

$$F = \frac{p - p_0}{1 - p_0} \quad \text{[Formula 1]}$$

$$p_0 = \frac{I_0(002)}{I_0(100) + I_0(002) + I_0(101)}$$

$$p = \frac{I_s(002)}{I_s(100) + I_s(002) + I_s(101)}$$

where $I_0$(hkl) and $I_s$(hkl) are diffraction intensities of the (hkl) planes in ICDD No. 361451 and the sample, respectively.

Production Method

The zinc oxide powder according to the present invention as described above can be produced as follows.

First, plate-like zinc oxide precursor particles are produced by a solution method using a zinc ion-containing raw material solution. Examples of zinc ion sources include zinc sulfate, zinc nitrate, zinc chloride, organic acid salts such as zinc acetate, zinc alkoxides, and the like. Zinc sulfate is preferable because it can also supply sulfate ions, which will be described below. A production technique for plate-like zinc oxide precursor particles by a solution method is not particularly limited, and production can be performed according to a known technique.

It is preferable that the raw material solution comprises a water-soluble organic material and sulfate ions because a porous material having a large specific surface area can be obtained. Examples of the water-soluble organic material include alcohols, polyols, ketones, polyethers, esters, carboxylic acids, polycarboxylic acids, celluloses, saccharides, sulfonic acids, amino acids, and amines, and more specifically, aliphatic alcohols such as methanol, ethanol, propanol, butanol, pentanol, and hexanol; aliphatic polyhydric alcohols such as ethylene glycol, propanediol, butanediol, glycerine, polyethylene glycol, and polypropylene glycol; aromatic alcohols such as phenol, catechol, and cresol; alcohols having a heterocycle such as furfuryl alcohol; ketones such as acetone, methyl ethyl ketone, and acetylacetone; ethers or polyethers such as ethyl ether, tetrahydrofuran, dioxane, polyoxyalkylene ether, ethylene oxide adduct, and propylene oxide adduct; esters such as ethyl acetate, ethyl acetoacetate, and glycine ethyl ester; carboxylic acids polycarboxylic acids, or hydroxycarboxylic acids, such as formic acid, acetic acid, propionic acid, butanoic acid, butyric acid, oxalic acid, malonic acid, citric acid, tartaric acid, gluconic acid, salicylic acid, benzoic acid, acrylic acid, maleic acid, glyceric acid, eleostearic acid, polyacrylic acid, polymaleic acid, and acrylic acid-maleic acid copolymer, and salts thereof; carboxymethylcelluloses; monosaccharides such as glucose and galactose; polysaccharides such as sucrose, lactose, amylose, chitin, and cellulose; sulfonic acids such as alkylbenzenesulfonic acid, para-toluenesulfonic acid, alkylsulfonic acid, α-olefinsulfonic acid, polyoxyethylenealkylsulfonic acid, ligninsulfonic acid, and naphthalenesulfonic acid, and salts thereof; amino acids such as glycine, glutamic acid, aspartic acid, and alanine; hydroxyamines such as monoethanolamine, diethanolamine, triethanolamine, and butanolamine; trimethyl aminoethyl alkylamide; alkylpyridinium sulfuric acid salts; alkyltrimethylammonium halides; alkylbetaines; alkyl diethylene triamino acetic acids; and the like. Among these water-soluble organic materials, those that have at least one functional group from a hydroxyl group, a carboxyl group, and an amino group are preferable, and hydroxycarboxylic acids having a hydroxyl group and a carboxyl group and salts thereof are particularly preferable, with examples being sodium gluconate, tartaric acid, and the like. It is preferable that the water-soluble organic material is concomitantly present in a range of about 0.001 wt% to about 10 wt% in an aqueous ammonia-added raw material solution, which will be described below. A preferable sulfate ion source is zinc sulfate as stated above. The raw material solution may further comprise the above-described additive substance such as a dopant.

At this time, the raw material solution is preferably heated to a preliminary reaction temperature of 70 to 100° C. and more preferably 80 to 100° C. After or during this heating, aqueous ammonia is preferably added to the raw material solution, and the raw material solution to which aqueous ammonia has been added is preferably retained at a temperature of 70 to 100° C. for 0.5 to 10 hours and more preferably at a temperature of 80 to 100° C. for 2 to 8 hours.

Next, the plate-like precursor particles are calcined by increasing the temperature to a calcination temperature according to a temperature schedule that includes a temperature zone where the temperature is increased at a rate of 150° C./h or lower to produce a zinc oxide powder comprising a plurality of plate-like zinc oxide particles. It is considered that by reducing the rate of temperature increase to 150° C./h or lower in at least one temperature zone (for example, the temperature zone not higher than 400° C.), the crystal plane of the precursor material is easily inherited by zinc oxide when the precursor material changes to zinc oxide, thus resulting in an enhanced degree of orientation of plate-like particles in a green body. Also, it is considered that the connectivity of primary particles to each other is increased, and plate-like particles are thus unlikely to collapse. The temperature increase may be performed at the aforementioned rate over the entire temperature range up to the calcination temperature. A preferable rate of temperature increase is 120° C./h or lower, more preferably 100° C./h or lower, even more preferably 50° C./h or lower, particularly preferably 30° C./h or lower, and most preferably 15° C./h or lower. The zinc oxide precursor particles are preferably washed, filtered, and dried before calcination. The calcination temperature is not particularly limited as long as the precursor compound such as zinc hydroxide can change into zinc oxide, and the calcination temperature is preferably 800 to 1100° C. and more preferably 850 to 1000° C. The plate-like precursor particles are retained at such a calcination temperature preferably for 0 to 3 hours and more preferably for 0 to 1 hour. Such temperature retaining conditions enable the precursor compound such as zinc hydroxide to change more reliably to zinc oxide. Due to such a calcination step, the plate-like precursor particles change into plate-like zinc oxide particles that have many pores.

Optionally, the zinc oxide powder may be mixed with an additive substance. Such additive substances may be, as secondary components, various additive agents or dopants, which impart properties (such as electroconductive or insulative properties) desired depending on the use or the specification of a green body. Preferable examples of dopant elements include B, Al, Ga, In, C, F, Cl, Br, I, H, Li, Na, K, N, P, As, Cu, Ag, and any combinations of these. These dopant elements may be added in the form of compounds containing these elements or in the form of ions to the zinc oxide powder. A method for adding the additive substance is not particularly limited, and preferable examples of methods for causing the additive substance to reach as far as the interior of the fine pores of the zinc oxide powder include (1) a method in which the additive substance is added in the form of a fine powder such as nanoparticles to the zinc oxide powder, (2) a method in which the additive substance is dissolved in a solvent and then added to the zinc oxide powder, and this solution is dried, and similar methods.

Calcination of the plate-like precursor particles may be performed in air, or may be performed in a vacuum atmosphere, an atmosphere of inert gas such as $N_2$ or Ar, or an $O_2$ atmosphere. In particular, it is more preferable to perform calcination in vacuum in a low temperature zone from room temperature to near 400° C. The rate of temperature increase may be changed in accordance with the temperature zone. For example, the rate of temperature increase may be reduced to no higher than 100° C./h up to near 400° C. Also, the plate-like precursor particles first may be calcined in a vacuum atmosphere until the temperature is near 400° C., then cooled to room temperature, and calcined again at 800° C. to 1100° C. in air.

Zinc Oxide Green Body and Zinc Oxide Sintered Body

Using the zinc oxide powder of the present invention, a highly oriented zinc oxide green body and zinc oxide sintered body can be prepared. That is, since the zinc oxide powder of the present invention is composed of plate-like particles, preparing a green body using a molding method such as tape casting or extrusion molding in which shearing force is applied to plate-like particles makes it possible to obtain a green body in which plate-like particles are oriented. Also, sintering such a highly oriented green body makes it possible to obtain a highly oriented sintered body. In addition, since an additive substance can be uniformly dispersed in this zinc oxide green body and zinc oxide sintered body, it is possible to exert to the maximum extent the desired properties that are to be imparted by the additive substance. When the zinc oxide powder does not contain the above-described additive substance, the additive substance may be added when preparing a green body, and addition of the additive substance can be also performed as described above.

The zinc oxide powder is oriented by a technique in which shearing force is used, and becomes an oriented green body. Preferable examples of techniques in which shearing force is used include tape casting, extrusion molding, a doctor blade method, and any combination of these. Regarding the orientation techniques in which shearing force is used, in any of the techniques referred to as examples above as well, it is preferable that additives such as a binder, a plasticizer, a dispersant, and a dispersion medium are suitably added to the plate-like zinc oxide powder to form a slurry, and this slurry is passed through a slit-like narrow outlet to discharge and mold the slurry into a sheet form on a substrate. The slit width of the outlet is preferably 10 to 400 µm. The amount of dispersion medium is preferably such an amount that the slurry viscosity is 5000 to 100000 cP and more preferably 8000 to 60000 cP. The thickness of the oriented green body molded into a sheet form is preferably 5 to 500 µm and more preferably 10 to 200 µm. It is preferable that multiple pieces of this oriented green body that has been molded into a sheet form are stacked to form a precursor laminate having a desired thickness, and this precursor laminate is subjected to press molding. This press molding can be preferably performed by packaging the precursor laminate in a vacuum pack or the like and subjecting it to isostatic pressing in hot water at a temperature of 50 to 95° C. under a pressure of 10 to 2000 kgf/cm². When extrusion molding is used, a flow channel in a metal mold may be designed such that the slurry passes through a narrow outlet inside the metal mold, then pieces of a green body in a sheet form are integrated into a single body in the metal mold, and the green body is discharged in a laminated state. It is preferable to perform dewaxing the resulting green body according to known conditions.

The oriented green body obtained as described above is fired at a firing temperature of 1000 to 1500° C. and preferably 1100 to 1450° C. to form a zinc oxide sintered body comprising oriented plate-like zinc oxide particles. The firing time at the aforementioned firing temperature is not particularly limited, and is preferably 1 to 10 hours and more preferably 2 to 5 hours. The zinc oxide sintered body obtained in this way has a high degree of orientation of the (002) plane at the plate face, and the degree of orientation is preferably 50% or greater, more preferably 60% or greater, even more preferably 70% or greater, and particularly preferably 80% or greater.

Uses

The zinc oxide powder of the present invention has a variety of uses including fillers for ultraviolet shielding in cosmetics, resins, fibers, packaging materials, coating materials, and the like; fillers for imparting electrical conductivity and thermal conductivity; and the like, and its uses are not particularly limited. Also, the zinc oxide green body and the zinc oxide sintered body of the present invention have a variety of uses including sputtering targets, thermoelectric materials, and the like, and their uses are not particularly limited.

EXAMPLES

The present invention will now be more specifically described by way of the following examples.

Example 1

Figure 2:
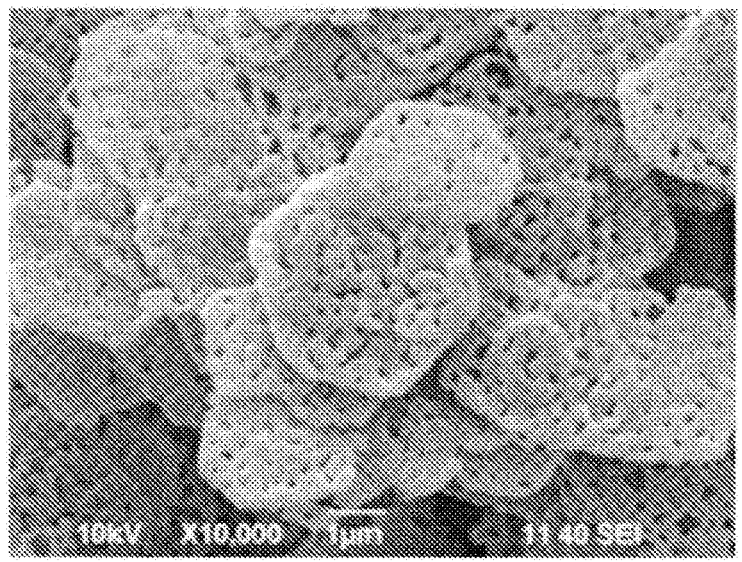
FIG. 2 is an SEM image of a zinc oxide powder according to the present invention obtained in Example 1.

(1) Preparation and Evaluation of Zinc Oxide Powder 173 g of zinc sulfate heptahydrate (manufactured by Kojundo Chemical Laboratory Co., Ltd.) and 0.45 g of sodium gluconate (manufactured by Wako Pure Chemical Industries, Ltd.) were dissolved in 300 g of ion exchanged water. The solution thus obtained was placed in a beaker and dissolved by heating to 90° C. while stirring with a magnetic stirrer. This solution was retained at 90° C., and 49 g of 25% aqueous ammonia was added dropwise with a microtube pump while stirring. After the end of dropwise addition, the solution was retained for 4 hours at 90° C. while stirring, and then the solution was added to 5 L of ion exchanged water and left to stand still. The precipitates deposited in the bottom of the vessel were separated by filtration, further, washed with ion exchanged water 3 times, and dried to give a zinc oxide precursor material in the form of a white powder. FIG. 1 shows an SEM image of the resulting zinc oxide precursor material. 10 g of the resulting zinc oxide precursor material was placed on a zirconia plate and calcined in air in an electric furnace to give 6.5 g of a plate-like porous zinc oxide powder. The temperature schedule during calcination was as follows: the temperature was increased at a rate of temperature increase of 100° C./h from room temperature to 900° C., then kept at 900° C. for 30 minutes, and cooled naturally. FIG. 2 shows an SEM image of the zinc oxide powder.

The resulting zinc oxide powder was evaluated by the following methods, and the results shown in Table 1 were obtained.

Evaluation 1: Average Particle Diameter Before Ball Mill Treatment $D_1$

The volume-based D50 average particle diameter of the zinc oxide powder was measured using a laser diffraction particle size distribution analyzer (manufactured by Nikkiso Co., Ltd., MT3300 EX II) and was regarded as the volume-based D50 average particle diameter of the zinc oxide powder before ball mill treatment $D_1$.

Evaluation 2: Specific Surface Area

The specific surface area of the zinc oxide powder was measured using a flow-type specific surface area analyzer (manufactured by Shimadzu Corporation, Flowsorb III 2305) and nitrogen as adsorption gas.

Evaluation 3: Degree of Orientation of Powder 0.1 g of the zinc oxide powder was added to 2 g of ethanol and dispersed with an ultrasonic disperser (ultrasonic cleaner) for 5 minutes. A 25 mm×50 mm glass substrate was spin-coated with this dispersion at 2000 rpm so as to attain a state in which a large number of plate-like particles do not overlap with each other and their plate faces are in planar contact with the surface of the slide glass. The glass substrate on which a thin zinc oxide film was formed in this way was used as a sample and the degree of orientation of the (002) plane was measured by XRD. Specifically, an XRD profile was obtained through irradiating the sample surface with an X ray by using an XRD apparatus (manufactured by Rigaku Corporation, RINT-TTR III), and the degree of orientation F of the (002) plane was calculated according to the following formulae:

$$F = \frac{p - p_0}{1 - p_0} \quad [\text{Formula 2}]$$

$$p_0 = \frac{I_0(002)}{I_0(100) + I_0(002) + I_0(101)}$$

$$p = \frac{I_s(002)}{I_s(100) + I_s(002) + I_s(101)}$$

where $I_0(hkl)$ and $I_s(hkl)$ are diffraction intensities of the (hkl) planes in ICDD No. 361451 and the sample, respectively.

Evaluation 4: Pore Volume

The volume of pores having a pore diameter of 10 nm to 1 µm of the zinc oxide powder (per unit weight of the powder) was measured with a mercury intrusion porosimeter (manufactured by Shimadzu Corporation, Autopore 9520).

Evaluation 5: Average Particle Diameter after Ball Mill Treatment $D_2$ 0.2 g of the zinc oxide powder, 30 g of ethanol, and 200 g of φ2 mm zirconia grinding ball were placed in a Polypot container having a volume of 100 mL (an I-Boy wide-mouth bottle manufacture by AS ONE Corporation, Part No. 5-002-02) and subjected to ball mill treatment at 124 rpm for 6 hrs. The volume-based D50 average particle diameter of the resulting ground powder was measured and regarded as an average particle diameter after ball mill treatment $D_2$. Using the average particle diameter $D_2$ thus obtained and the average particle diameter $D_1$ previously obtained, the ratio $D_1/D_2$ of average particle diameters before and after ball mill treatment was calculated.

(2) Preparation and Evaluation of Zinc Oxide Sintered Body 8.8 parts by weight of aluminum chloride hexahydrate (manufactured by Kojundo Chemical Laboratory Co., Ltd.) was added to and dissolved in 200 parts by weight of ethanol. To the resulting solution was added 100 parts by weight of the plate-like zinc oxide particles obtained in (1) above, this mixture was dried by using a rotary evaporator, and thereby plate-like zinc oxide particles in which the aluminum component was uniformly dispersed was prepared. 100 parts by weight of the resulting plate-like zinc oxide particles were mixed with 15 parts by weight of a binder (polyvinyl butyral: Part No. BM-2, manufactured by Sekisui Chemical Co., Ltd.), 6.2 parts by weight of a plasticizer (DOP: di(2-ethylhexyl)phthalate, manufactured by Kurogane Kasei Co., Ltd.), 3 parts by weight of a dispersant (trade name: Rheodol SP-O30, manufactured by Kao Corporation), and a dispersion medium (2-ethylhexanol). The amount of the dispersion medium was adjusted such that the slurry viscosity was 10000 cP. The slurry thus prepared was applied to a PET film by a doctor blade method to form a sheet having a thickness after drying of 20 μm. The resulting tape was cut into 40×40 mm squares, and 30 pieces of the cut tape were stacked, placed on an aluminum plate having a thickness of 10 mm, and then vacuum-packed. This vacuum pack was subjected to isostatic pressing in hot water at 85° C. under a pressure of 100 kgf/cm² to prepare a plate-like green body. The resulting green body was placed in a dewaxing furnace and dewaxed under 600° C. and 20 hour conditions. The resulting dewaxed body was fired at atmospheric pressures under 1400° C. and 5 hour conditions in air to prepare a plate-like sintered body.

Evaluation 6: Degree of Orientation

The degree of orientation of the sintered body was measured in the same manner as in Evaluation 3 except that the plate face of the plate-like sintered body was used as a sample surface.

Evaluation 7: Volume Resistivity

The volume resistivity of the sintered body was measured by using a resistivity meter (manufactured by Mitsubishi Chemical Corporation, Loresta AX Model MCP-T370) by performing a four-point probe method near the central part of the plate face of the plate-like sintered body. As a result, a volume resistivity as low as $8 \times 10^{-3}$ Ωcm was obtained. This is considered to be attributable to the high degree of orientation of the sintered body and the enhanced solid solution formation of the additive substance (Al). The high degree of orientation of the sintered body is considered to be because the plate-like particles were unlikely to collapse (this can be understood from the fact that the particle size change due to the mill treatment was small), the plate-like raw material zinc oxide powder had an appropriately large particle diameter and was readily arrayed during tape casting, and the degree of orientation of the plate-like particles was high. Moreover, the enhancement of the solid solution formation of the additive substance is considered to be because the plate-like raw material zinc oxide powder particles were porous and had a large specific surface area, so that the aluminum component dissolved in the solvent could easily enter the pores of the particles during the mixing of zinc oxide and aluminum chloride hexahydrate and thus could readily form a solid solution with zinc oxide.

Example 2

Figure 3:
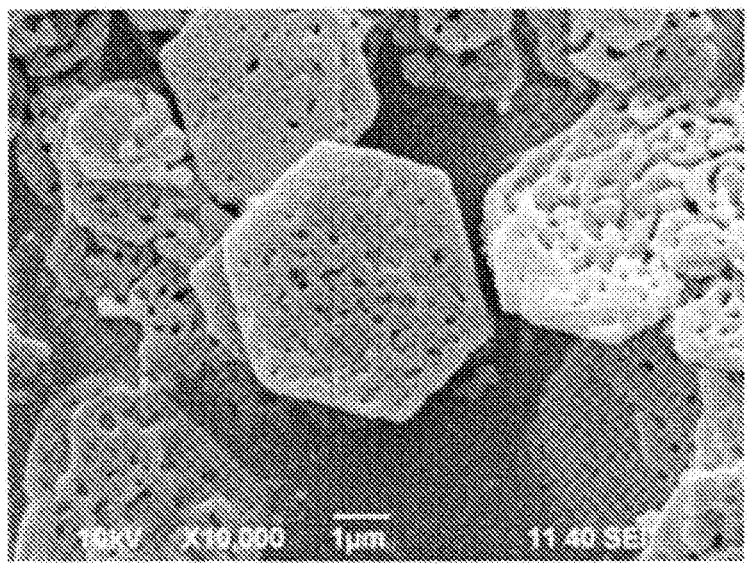
FIG. 3 is an SEM image of a zinc oxide powder according to the present invention obtained in Example 2.

A zinc oxide powder and a sintered body were prepared and evaluated in the same manner as in Example 1 except that the rate of temperature increase during calcination of the zinc oxide precursor material was 15° C./h. An SEM image of the zinc oxide powder is shown in FIG. 3. Reducing the rate of temperature increase allowed the crystal plane of the precursor material to be more easily inherited when the precursor material changed into zinc oxide, and the degree of orientation of the powder increased. Thus, the sintered body exhibited an increased degree of orientation and a lowered resistance.

Example 3

Comparative

Figure 4:
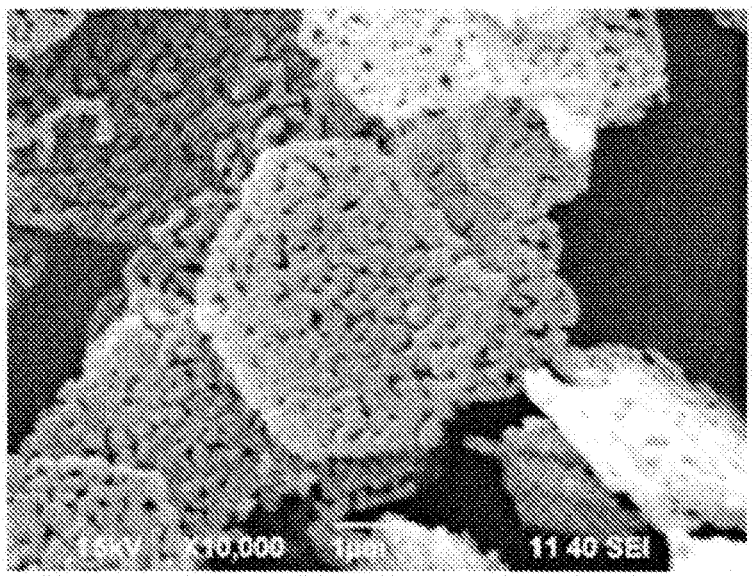
FIG. 4 is an SEM image of a zinc oxide powder according to a comparative embodiment obtained in Example 3.

A zinc oxide powder and a sintered body were prepared and evaluated in the same manner as in Example 1 except that the rate of temperature increase during calcination of the zinc oxide precursor material was 200° C./h. An SEM image of the zinc oxide powder is shown in FIG. 4. The crystal plane of the precursor was less likely to be inherited when the precursor material changed into zinc oxide, and the degree of orientation of the powder decreased. Also, necking between primary particles was weak, and the strength of the plate-like powder decreased (this can be understood from the large grain size change due to the ball mill treatment). Thereby the sintered body exhibited a lowered degree of orientation and an increased resistance.

Example 4

Comparative 40.8 g of zinc chloride (manufactured by Kojundo Chemical Laboratory Co., Ltd.) and 1.2 g of hydrochloric acid (manufactured by Kanto Chemical Co., Inc., special grade) were dissolved in 200 g of ion exchanged water to prepare solution A. Also, 126 g of hexamethylenetetramine (manufactured by Kanto Chemical Co., Inc.) was dissolved in 150 g of ion exchanged water to prepare solution B. Solution B was added dropwise to solution A while stirring until pH reached 6.3, and the mixture was retained at 100° C. for 1 h. The precipitates were separated by filtration, further, washed with ion exchanged water 3 times, and dried to give a zinc oxide precursor material in the form of a white powder. This was calcined in air in an electric furnace to give a plate-like dense zinc oxide powder. The temperature schedule during calcination was as follows: the temperature was increased at a rate of temperature increase of 200° C./h from room temperature to 800° C., kept at 800° C. for 60 minutes, and naturally cooled. According to the method as used in Example 1, the plate-like zinc oxide and aluminum chloride were mixed and tape casting was performed to prepare a plate-like sintered body. While the degree of orientation of the sintered body was comparatively high at 71%, its volume resistivity was as high as $1 \times 10^{-1}$ Ωcm. This is considered to be because the zinc oxide powder was dense (had a small specific surface area), therefore the state of mixing with the aluminum component became worse than that attained when a porous zinc oxide raw material powder was used, and sufficient formation of an aluminum solid solution did not occur.

TABLE 1

| | Properties of powder | | | | | Properties of sintered body | |
|---|---|---|---|---|---|---|---|
| | Average particle diameter $D_1$ [μm] | Specific surface area [m$^2$/g] | Degree of orientation [%] | Pore volume of pores having a diameter of 10 nm to 1 μm [mL/g] | Ratio of average particle diameters before and after ball mill treatment $D_1/D_2$ | Degree of orientation [%] | Volume resistivity [Ωcm] |
| Ex. 1 | 3.0 | 2.8 | 50 | 0.24 | 3.2 | 58 | $8 \times 10^{-3}$ |
| Ex. 2 | 3.9 | 2.3 | 65 | 0.14 | 2.0 | 80 | $5 \times 10^{-3}$ |
| Ex. 3 (comp.) | 2.7 | 2.9 | 23 | 0.32 | 5.5 | 28 | $2 \times 10^{-2}$ |
| Ex. 4 (comp.) | 2.0 | 0.8 | 60 | Not detected | 1.8 | 71 | $1 \times 10^{-1}$ |

What is claimed is:

1. A zinc oxide powder comprising a plurality of plate-like zinc oxide particles, the zinc oxide powder having a volume-based D50 average particle diameter of 1 to 5 μm, a specific surface area of 1 to 5 m$^2$/g, and a degree of orientation of a (002) plane of 60% or greater when the zinc oxide powder is two-dimensionally arrayed into a monolayer on a substrate.

2. The zinc oxide powder according to claim 1, wherein a volume of pores having a pore diameter of 10 nm or greater and 1 μm or less per unit weight is 0.08 mL/g or greater.

3. The zinc oxide powder according to claim 1, wherein when ball mill treatment is performed on the zinc oxide powder, a ratio of a volume-based D50 average particle diameter of the zinc oxide powder before the ball mill treatment $D_1$ to a volume-based D50 average particle diameter of the zinc oxide powder after the ball mill treatment $D_2$, i.e., $D_1/D_2$, is less than 4.0, wherein the ball mill treatment is performed by placing zinc oxide powder and 200 g of φ2 mm zirconia grinding balls in a pot having a volume of 100 mL, and grinding the powder with a ball mill for 6 hrs.

4. The zinc oxide powder according to claim 1, wherein the plate-like zinc oxide particles further comprise an additive substance.

5. The zinc oxide powder according to claim 1, wherein the specific surface area is 1 to 4.5 m$^2$/g.

6. A method for producing a plate-like zinc oxide powder, comprising the steps of:
    subjecting a raw material solution containing zinc ion and sulfate ion to a solution method to produce plate-like zinc oxide precursor particles, and
    calcining the plate-like precursor particles by increasing a temperature to a calcination temperature according to a temperature schedule that includes a temperature zone where the temperature is increased at a rate of 50° C./h or lower to produce a zinc oxide powder comprising a plurality of plate-like zinc oxide particles,
    wherein the zinc oxide powder has a volume-based D50 average particle diameter of 1 to 5 μm, a specific surface area of 1 to 5 m$^2$/g, and a degree of orientation of a (002) plane of 60% or greater when the zinc oxide powder is two-dimensionally arrayed into a monolayer on a substrate.

7. The method according to claim 6, wherein the raw material solution further comprises a water-soluble organic material.

8. The method according to claim 6, further comprising the step of mixing an additive substance with the zinc oxide powder.

9. The method according to claim 6, wherein the zinc oxide precursor particles are washed, filtered, and dried before the calcination.

10. The method according to claim 6, wherein the calcination temperature is 800 to 1100° C., and wherein the plate-like precursor particles are retained at the calcination temperature for 0 to 3 hours.

11. The method according to claim 6, wherein the step of producing the plate-like zinc oxide precursor particles includes heating the raw material solution to a preliminary reaction temperature of 70 to 100° C.

12. The method according to claim 11, wherein in the step of producing the plate-like zinc oxide precursor particles, aqueous ammonia is added to the raw material solution after or during the heating.

13. The method according to claim 12, wherein in the step of producing the plate-like zinc oxide precursor particles, the raw material solution to which the aqueous ammonia has been added is retained at a temperature of 70 to 100° C. for 0.5 to 10 hours.

* * * * *